United States Patent
Potapova et al.

(10) Patent No.: US 7,833,934 B2
(45) Date of Patent: Nov. 16, 2010

(54) HYDROCARBON REFORMING CATALYST, METHOD OF PREPARING THE SAME AND FUEL PROCESSOR INCLUDING THE SAME

(75) Inventors: Yulia Potapova, Yongin-si (KR); Soon-ho Kim, Seoul (KR); Doo-hwan Lee, Daejeon-si (KR); Hyun-chul Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 477 days.

(21) Appl. No.: 11/605,435

(22) Filed: Nov. 29, 2006

(65) Prior Publication Data

US 2007/0197376 A1    Aug. 23, 2007

(30) Foreign Application Priority Data

Feb. 18, 2006    (KR) .................. 10-2006-0015941

(51) Int. Cl.
   *B01J 23/00*    (2006.01)
   *B01J 21/00*    (2006.01)
   *B01J 20/00*    (2006.01)
   *B01J 29/00*    (2006.01)
   *B01J 37/00*    (2006.01)

(52) U.S. Cl. .................. 502/327; 502/182; 502/184; 502/185; 502/240; 502/304; 502/324; 502/326; 502/332; 502/333; 502/334; 502/335; 502/336; 502/337; 502/338; 502/339; 502/345; 502/346; 502/349; 502/350; 502/351; 502/355; 502/415; 502/439

(58) Field of Classification Search .................. 502/182, 502/184, 185, 240, 304, 324, 326, 327, 332, 502/333, 334, 335, 336, 337, 338, 339, 345, 502/346, 349, 350, 351, 355, 415, 439
See application file for complete search history.

(56) References Cited

U.S. PATENT DOCUMENTS 3,470,019 A * 9/1969 Steele .................. 502/326
3,822,220 A * 7/1974 Veltman .................. 502/5

(Continued)

FOREIGN PATENT DOCUMENTS

CN    1169887    1/1998

(Continued)

OTHER PUBLICATIONS

Office Action issued by the Chinese Patent Office on Aug. 1, 2008.

(Continued)

*Primary Examiner*—Cam N Nguyen
(74) *Attorney, Agent, or Firm*—Lee & Morse, P.C.

(57) ABSTRACT

A hydrocarbon reforming catalyst, a method of preparing the same, and a fuel processor including the same includes the hydrocarbon reforming catalyst having an active catalyst component impregnated in a oxide carrier and a thermally conductive material having higher thermal conductivity than that of the oxide carrier, the method of preparing the same, and a fuel processor including the same. The hydrocarbon reforming catalyst has excellent catalytic activity and thermal conductivity, and thus can easily transfer heat required in a hydrocarbon reforming reaction. Accordingly, by using the hydrocarbon reforming catalyst above, a high hydrogen production rate can be obtained.

18 Claims, 5 Drawing Sheets

U.S. PATENT DOCUMENTS

| | | | | |
|---|---|---|---|---|
| 5,010,049 | A * | 4/1991 | Villa-Garcia et al. | 502/60 |
| 5,488,023 | A * | 1/1996 | Gadkaree et al. | 502/182 |
| 5,578,543 | A * | 11/1996 | Tennent et al. | 502/180 |
| 5,876,867 | A * | 3/1999 | Itoh et al. | 429/44 |
| 6,235,674 | B1 * | 5/2001 | Tennent et al. | 502/174 |
| 6,841,512 | B1 * | 1/2005 | Fetcenko et al. | 502/335 |
| 6,849,572 | B2 * | 2/2005 | Hwang et al. | 502/325 |
| 6,861,387 | B2 * | 3/2005 | Ruth et al. | 502/184 |
| 6,881,703 | B2 * | 4/2005 | Cutler et al. | 502/439 |
| 6,897,178 | B1 * | 5/2005 | Thompson et al. | 502/185 |
| 6,924,316 | B2 * | 8/2005 | Iwamoto et al. | 518/717 |
| 6,964,826 | B2 * | 11/2005 | Ovshinsky et al. | 429/44 |
| 6,967,183 | B2 * | 11/2005 | Hampden-Smith et al. | 502/101 |
| 7,037,873 | B2 * | 5/2006 | Kato | 502/180 |
| 7,157,401 | B2 * | 1/2007 | Purta et al. | 502/180 |
| 7,235,324 | B2 * | 6/2007 | Sugimasa et al. | 429/40 |
| 7,354,881 | B2 * | 4/2008 | Resasco et al. | 502/185 |
| 7,470,648 | B2 * | 12/2008 | Wang et al. | 502/342 |
| 7,572,416 | B2 * | 8/2009 | Alward et al. | 422/180 |
| 7,740,669 | B2 | 6/2010 | Lee et al. | |
| 2003/0045425 | A1 * | 3/2003 | Ruth et al. | 502/325 |
| 2003/0091891 | A1 * | 5/2003 | Yoshida et al. | 429/44 |
| 2004/0010160 | A1 * | 1/2004 | Coleman et al. | 562/17 |
| 2004/0097371 | A1 * | 5/2004 | Jangbarwala | 502/439 |
| 2004/0158112 | A1 * | 8/2004 | Ramani et al. | 585/658 |
| 2005/0031920 | A1 * | 2/2005 | Igarashi et al. | 429/19 |
| 2005/0096213 | A1 * | 5/2005 | Thompson et al. | 502/185 |
| 2005/0169818 | A1 * | 8/2005 | Ohno et al. | 422/177 |
| 2006/0057055 | A1 * | 3/2006 | Resasco et al. | 423/447.3 |
| 2006/0068988 | A1 * | 3/2006 | Coleman et al. | 502/182 |
| 2006/0182679 | A1 * | 8/2006 | Ilinich et al. | 423/648.1 |
| 2006/0251952 | A1 * | 11/2006 | Chondroudis et al. | 429/44 |
| 2006/0260955 | A1 * | 11/2006 | Sasaki et al. | 205/759 |
| 2008/0314755 | A1 * | 12/2008 | Botte | 205/159 |
| 2009/0291846 | A1 * | 11/2009 | Resasco et al. | 502/185 |
| 2009/0297434 | A1 * | 12/2009 | Wang et al. | 423/648.1 |

FOREIGN PATENT DOCUMENTS

| | | |
|---|---|---|
| GB | 1 485 370 | 9/1977 |
| JP | 10-000365 | 1/1998 |
| JP | 2004-269332 | 9/2004 |
| JP | 2005-047743 | 2/2005 |
| JP | 2005-327732 A | 11/2005 |
| WO | WO 2004/035466 | 4/2004 |

OTHER PUBLICATIONS

Japanese Office Action issued Oct. 27, 2009.

Certificate of Patent No. ZL 200610171916 issued in the corresponding Chinese application by the Chinese Intellectual Property Office on Oct. 21, 2009 (including the Chinese application CN 100551525C), (English translation of Certificate of Patent).

* cited by examiner

HYDROCARBON REFORMING CATALYST, METHOD OF PREPARING THE SAME AND FUEL PROCESSOR INCLUDING THE SAME

CROSS-REFERENCE TO RELATED APPLICATION

This application claims the benefit of Korean Patent Application No. 2006-15941, filed on Feb. 18, 2006 in the Korean Intellectual Property Office, the disclosure of which is incorporated herein in its entirety by reference.

BACKGROUND OF THE INVENTION

1. Field of the Invention

Aspects of the present invention relate to a hydrocarbon reforming catalyst, a method of preparing the same, and a fuel processor including the same. More particularly, aspects of the present invention relate to a hydrocarbon reforming catalyst including an active catalyst component impregnated in an oxide carrier and a thermally conductive material having higher thermal conductivity than that of the oxide carrier, a method of preparing the same, and a fuel processor including the same.

2. Description of the Related Art

Fuel cells are electricity generation systems that directly convert the chemical energy of oxygen, and hydrogen in hydrocarbons, to electrical energy. Examples of hydrocarbons include methanol, ethanol, and natural gas.

Fuel cell systems include a fuel cell stack, a fuel processor (FP), a fuel tank, and a fuel pump. The fuel cell stack is the main body of a fuel cell, and comprises a plurality (several to several tens) of unit cells that each includes a membrane electrode assembly (MEA) and a separator (or bipolar plate).

The fuel pump supplies fuel in the fuel tank to the fuel processor. The fuel processor produces hydrogen by reforming and purifying the supplied fuel and further supplies the produced hydrogen to the fuel cell stack. The fuel cell stack receives the hydrogen and generates electrical energy from an electrochemical reaction of the hydrogen with oxygen.

The fuel processor includes a reformer. The reformer of the fuel processor reforms hydrocarbon fuel using a reforming catalyst. However, because the hydrocarbon fuel contains a sulfur compound, the reforming catalyst can be easily poisoned by the sulfur compound. Accordingly, it is necessary to remove the sulfur compound prior to reforming the hydrocarbon fuel. Thus, hydrocarbon fuel is subjected to desulfurization prior to a reforming process as shown in FIG. 1.

Figure 1:
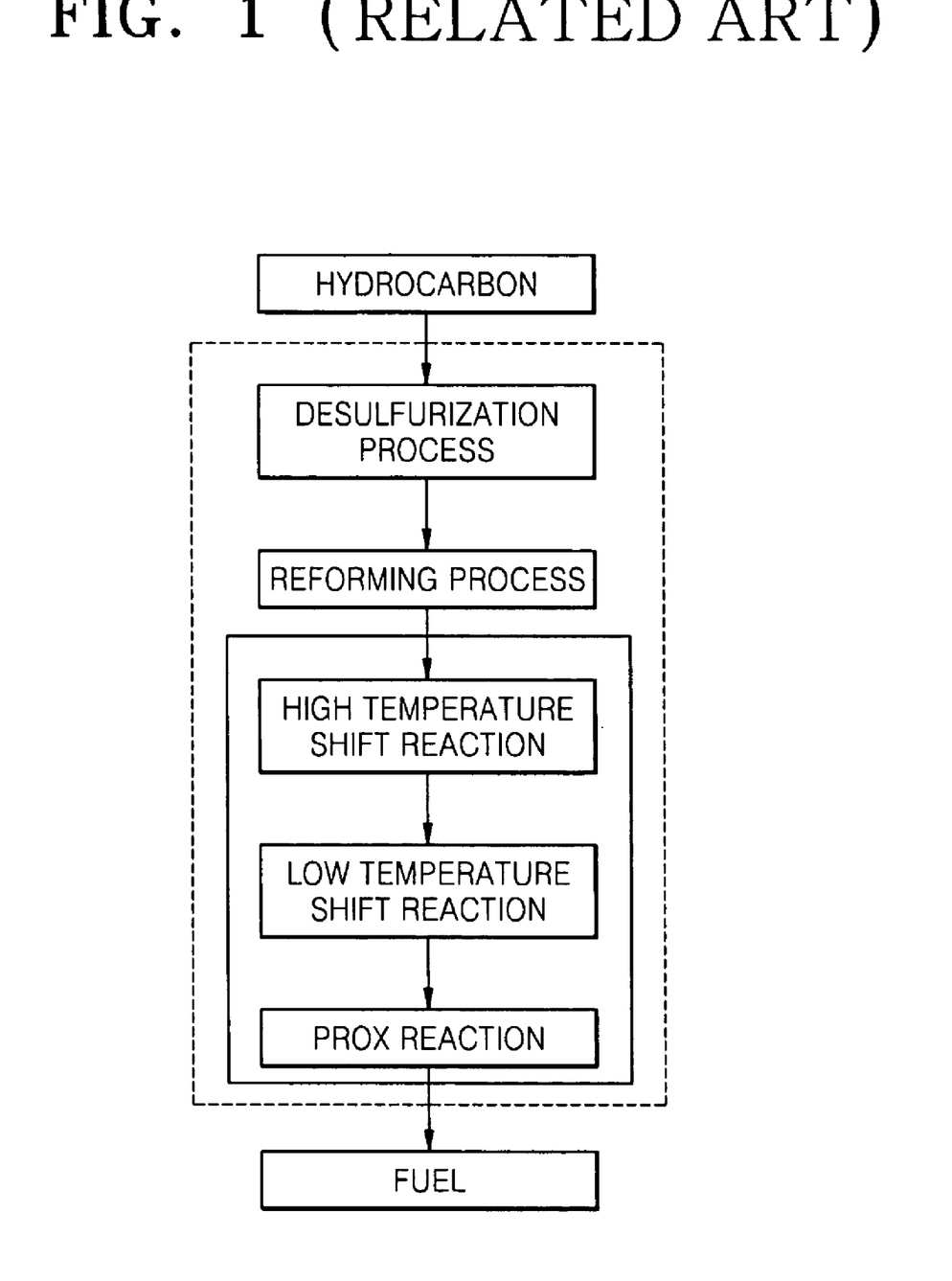
FIG. 1 is a schematic flowchart illustrating a method of processing fuel in a fuel processor of a related art fuel cell system.

FIG. 1 is a schematic flowchart illustrating a method of processing fuel in a fuel processor of a related art fuel cell system. As shown in FIG. 1, a desulfurization process, a reforming process, and a carbon monoxide (CO) removing process are performed in the fuel processor. The CO removing process includes a high temperature shift reaction, a low temperature shift reaction, and a preferential CO oxidation (PROX) reaction.

During the reforming process, for an example of the natural gas steam reforming, the reformer reforms a hydrocarbon fuel using a reforming catalyst with an addition of steam ($H_2O$) to the hydrocarbon fuel to produce hydrogen through Reaction 1:

[Reaction 1]

The Reaction 1 occurring during the reforming process of the hydrocarbon fuel is an endothermic process that requires a great amount of heat. Accordingly, the reforming process requires a supply of heat, and thus is performed by using a catalyst at a high temperature. To obtain a high hydrogen production rate, a catalyst having excellent catalytic activity and high thermal conductivity is needed to instantly transfer heat required for the reaction.

Research on related art hydrocarbon reforming catalysts is focused on high catalytic activity. Generally, excellent catalytic activity is obtained by using a catalyst with precious metal active component distributed on a carrier formed of an oxide such as alumina, silica, or the like. However, for a better hydrocarbon conversion rate, a hydrocarbon reforming catalyst having both a high catalytic activity and a high thermal conductivity is required.

SUMMARY OF THE INVENTION

According to aspects of the present invention, a hydrocarbon reforming catalyst includes excellent or high catalytic activity and thermal conductivity for a rapid transfer of heat required in a hydrocarbon reforming reaction to obtain a high hydrogen production rate, a method of preparing the same, and a fuel processor including the same.

According to aspects of the present invention, a hydrocarbon reforming catalyst includes: an active catalyst component impregnated in an oxide carrier; and a thermally conductive material having higher thermal conductivity than that of the oxide carrier.

According to another aspect of the present invention, a method of preparing a hydrocarbon reforming catalyst includes: mixing an oxide carrier and a thermally conductive material having higher thermal conductivity than that of the oxide carrier to form a mixture; impregnating an active catalyst component in the mixture to form a resultant; drying the resultant; and heat treating the dried resultant.

According to another aspect of the present invention, a method of preparing a hydrocarbon reforming catalyst includes: impregnating an active catalyst component in an oxide carrier to form a resultant; drying the resultant; mixing the dried resultant with a thermally conductive material having higher thermal conductivity than that of the oxide carrier to form a mixture; and heat treating the mixture.

According to another aspect of the present invention, a fuel processor includes the hydrocarbon reforming catalyst.

According to another aspect of the present invention, a hydrocarbon reforming catalyst includes: an oxide; a catalyst component; and a thermal conductive material having a higher thermal conductivity than that of the oxide, wherein the catalyst component is impregnated into the oxide and/or the thermally conductive material.

According to another aspect of the present invention, a hydrocarbon reforming catalyst includes: an oxide; a catalyst component; and a thermal conductive material having a higher thermal conductivity than that of the oxide, wherein the catalyst component is not formed of a shell on the oxide.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Reference will now be made in detail to the aspects of the present invention, examples of which are illustrated in the accompanying drawings, wherein like reference numerals refer to the like elements throughout. The aspects are described below in order to explain the present invention by referring to the figures.

A hydrocarbon reforming catalyst according to an aspect of the present invention includes an active catalyst component impregnated in an oxide carrier, and a thermally conductive material having higher thermal conductivity than that of the oxide carrier.

To satisfy a high catalytic activity required in a hydrocarbon reforming catalyst, the hydrocarbon reforming catalyst according to aspects of the present invention not only includes the oxide carrier to disperse the active catalyst component, but also includes the thermally conductive material to satisfy a high thermal conductivity.

Thus, the oxide carrier and the thermally conductive material are mixed in an appropriate ratio to prepare them for inclusion into the hydrocarbon reforming catalyst having desired shape and size suitable for the use in the hydrocarbon reforming catalyst. Also, by mixing the oxide carrier and the thermally conductive material in an appropriate ratio, catalytic activity and thermal conductivity of the hydrocarbon reforming catalyst can be easily controlled.

Figure 2:
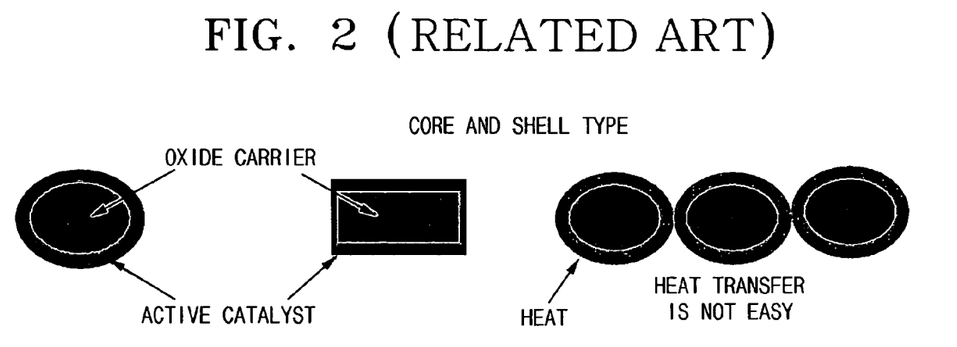
FIG. 2 is a schematic drawing of a structure of a related art hydrocarbon reforming catalyst particle.
Figure 3:
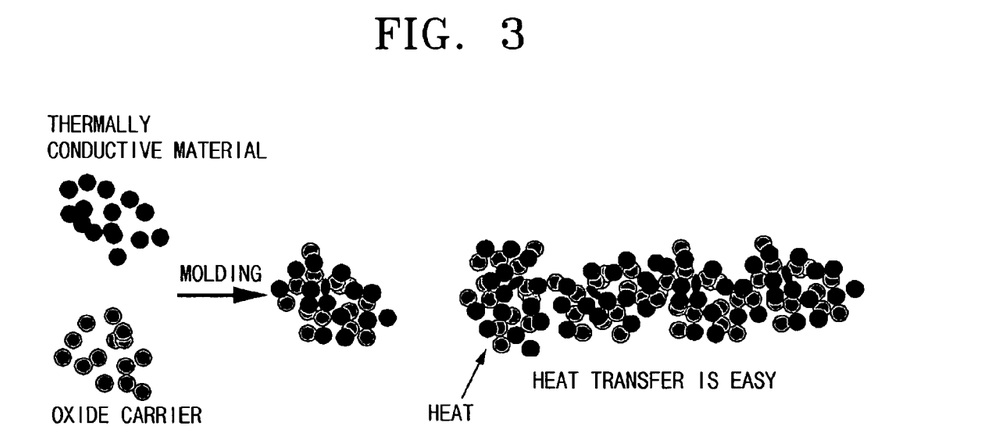
FIG. 3 is a schematic drawing of a structure of a hydrocarbon reforming catalyst particle according to an aspect of the present invention.

FIG. 2 is a schematic drawing of a structure of a related art hydrocarbon reforming catalyst particle, and FIG. 3 is a schematic drawing of a structure of a hydrocarbon reforming catalyst particle according to an aspect of the present invention. The structure of the related art hydrocarbon reforming catalyst particle and the structure of the hydrocarbon reforming catalyst particle according to an aspect of the present invention are discussed together to show the differences.

Referring to FIG. 2, the related art hydrocarbon reforming catalyst particle has a core and shell type structure. That is, the related art hydrocarbon reforming catalyst particle has a structure where a metallic active component is dispersed or coated on the surface of an oxide molded product having a certain size and shape. In this case, heat required in a reaction is not transferred easily.

On the other hand, referring to FIG. 3, the hydrocarbon reforming catalyst particle according to an aspect of the present invention has a structure that includes an active catalyst component impregnated in an oxide carrier and/or a thermally conductive material having higher thermal conductivity than that of the oxide carrier. The hydrocarbon reforming catalyst is prepared by mixing or molding the oxide carrier in a powder form and the thermally conductive material. Accordingly, the hydrocarbon reforming catalyst according to aspects of the present invention has excellent or high catalytic activity and thermal conductivity.

Preferably, though not required, the oxide carrier may have a porous structure having a large surface area. The surface area of the oxide carrier may be in the range of 10 to 800 m$^2$/g. When the surface area is less than 10 m$^2$/g, dispersion of the active catalyst component impregnated therein is too small, and sufficient catalytic activity cannot be obtained. On the other hand, when the surface area is greater than 800 m$^2$/g, mechanical properties of the oxide carrier deteriorate.

Preferably, though not required, thermal conductivity of the thermally conductive material may be in the range of 15 to 600 Wm$^{-1}$K$^{-1}$ at room temperature. When the thermal conductivity is less than 15 Wm$^{-1}$K$^{-1}$, the thermally conductive material has lower thermal conductivity than that of the oxide carrier, and the thermally conductive material does not have any effect on improving the reaction efficiency of the hydrocarbon reforming catalyst. Also, when the thermal conductivity is higher than 600 Wm$^{-1}$K$^{-1}$, the thermally conductive material does not have any significant effect on the hydrocarbon reforming catalyst.

In various aspects, the oxide carrier, for example, may include $Al_2O_3$, $SiO_2$, $TiO_2$, $ZrO_2$, and $CeO_2$, or the like, or any combination thereof, but is not limited thereto.

In various aspects, the thermally conductive material, for example, may include a thermally conductive metallic material, such as Al, Mg, Co, Fe, Ni, Mo, or the like, or any combination thereof. The thermally conductive material may include a thermally conductive carbon-based material, such as graphite, carbon black, or the like, or any combination thereof. In various aspects, the thermally conductive material may include one or more of the thermally conductive metallic material and one or more of the thermally conductive carbon-based material, or any combination thereof.

The amount of the oxide carrier in the hydrocarbon reforming catalyst may be in the range of 10 to 90 wt % of the total combined weight of the oxide carrier and the thermally conductive material. The amount of the thermally conductive material may be in the range of 10 to 90 wt % of the total combined weight of the oxide carrier and the thermally conductive material. When the amount of the thermally conductive material is greater than the above range (i.e., 90 wt %), the relative amount of the oxide carrier impregnated with the active catalyst component is too small, and the whole reaction efficiency deteriorates. When the amount of the oxide carrier is greater than the above range (i.e., 90 wt %), the relative amount of the thermally conductive material is too small, and the thermal conductivity of the catalyst deteriorates, so that the whole reaction efficiency deteriorates.

The active catalyst component, such as a catalyst metal, may be a transition metal that is active in the reforming reaction of fuel, such as a hydrocarbon gas. The active catalyst component, for example, may include ruthenium (Ru), platinum (Pt), rhodium (Rh), cobalt (Co), nickel (Ni), palladium (Pd), or the like, or any combination thereof, but is not limited thereto.

In various aspects, the amount of the active catalyst component may be in the range of 0.1 to 20 wt % of the total amount (weight) of the hydrocarbon reforming catalyst (e.g., the total combined weight of the oxide carrier, the thermally conductive material, and/or the active catalyst component). When the amount of the active catalyst component is less than 0.1 wt %, sufficient reaction activity in the hydrocarbon reforming reaction cannot be obtained. On the other hand, when the amount is greater than 20 wt %, sufficient reaction activity compared to the amount of supported catalyst cannot be obtained. That is, additional reaction activity is not obtained by the additional amount of the active catalyst component.

In various aspects, the active catalyst component and/or the thermally conductive materials may be impregnated or interstitially situated and/or dispersed inside the oxide carrier, which may be porous. The thermally conductive material may form bridges extending from one area of the oxide carrier to another area of the oxide carrier, or may be connected in a chain within the oxide carrier. In various aspects of the present invention, the thermally conductive material may form different crystal domains from that of the oxide carrier, and the crystal domains of the thermally conductive material may be dispersed between the crystal domains of the oxide carrier.

Figure 4:
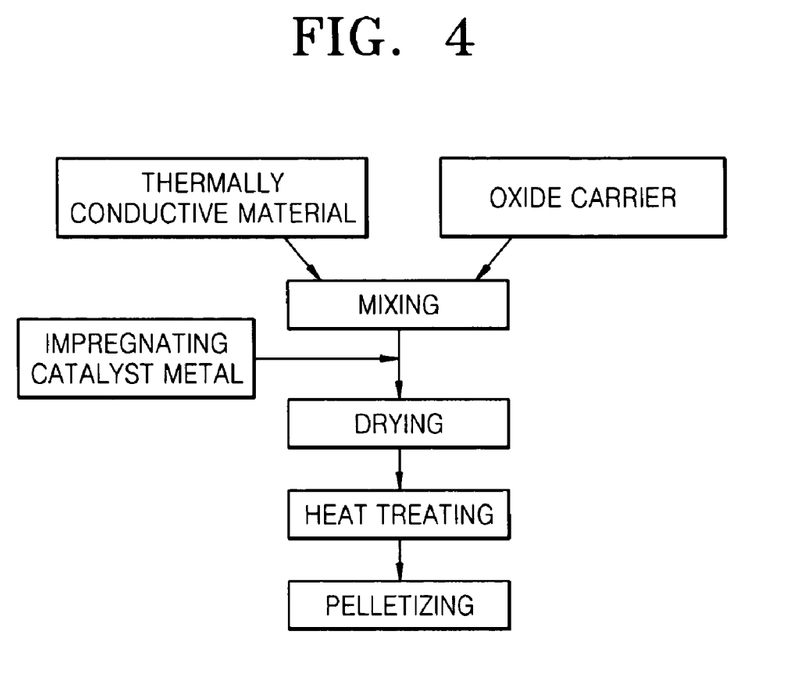
FIG. 4 is a schematic flowchart illustrating a method of preparing a hydrocarbon reforming catalyst according to an aspect of the present invention.
Figure 5:
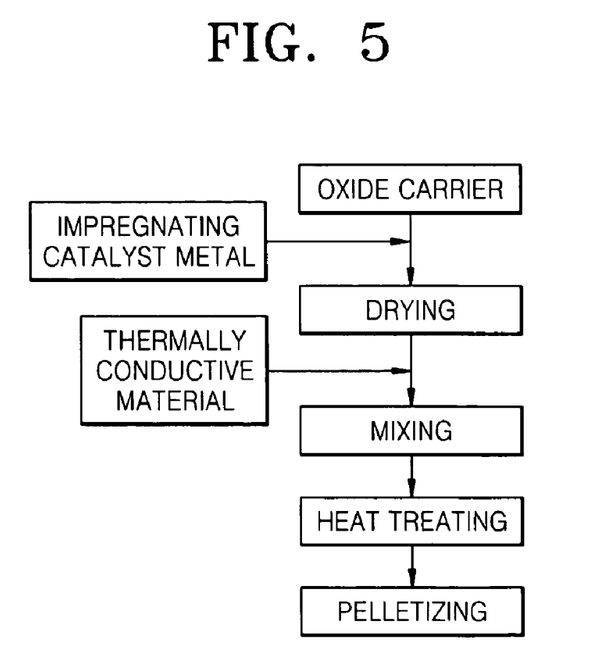
FIG. 5 is a schematic flowchart illustrating a method of preparing a hydrocarbon reforming catalyst according to another aspect of the present invention.

Hereinafter, methods of preparing a hydrocarbon reforming catalyst according to aspects of the present invention will be described. FIGS. 4 and 5 are schematic flowcharts illustrating methods of preparing a hydrocarbon reforming catalyst according to aspects of the present invention.

Referring to FIG. 4, according to an aspect of the present invention, a method of preparing a hydrocarbon reforming catalyst includes mixing an oxide carrier and a thermally conductive material having higher thermal conductivity than that of the oxide carrier, impregnating an active catalyst component in the resultant mixture, drying the resultant, and heat treating the dried resultant.

As shown, one or both of the oxide carrier and the thermally conductive material are in a powder form or in small pieces. First, as shown, the oxide carrier and the thermally conductive material having higher thermal conductivity than that of the oxide carrier are mixed. The mixing of the oxide carrier and the thermally conductive material is performed using a mechanical agitator, etc. The details of the thermally conductive material and the oxide carrier are as described above.

The average particle size of the thermally conductive material may be in the range of 0.1 µm to 5 mm and the average particle size of the oxide carrier may be in the range of 0.1 µm to 5 mm. When the average particle sizes of the thermally conductive material and the oxide carrier are less than 0.1 µm, hydrocarbon fuel and reaction product cannot easily flow in and out of the molded catalyst. When the average particle sizes of the thermally conductive material and the oxide carrier are greater than 5 mm, contact areas of the thermally conductive material and the oxide carrier are reduced, thereby reducing the thermal conductivity of the formed catalyst.

The mixing weight ratio of the thermally conductive material and the oxide carrier may be in the range of 1:9 to 9:1 as described above.

In various aspects, the impregnation of the active catalyst component in the resultant mixture of the oxide carrier and the thermally conductive material is performed using any various methods or techniques. Examples of the various impregnation method include deposition-precipitation, co-precipitation, wet impregnation, sputtering, gas-phase grafting, liquid-phase grafting, incipient-wetness impregnation, and the like, which are well known. Accordingly, detailed discussion of the methods will be omitted. Nevertheless, wet impregnation or incipient-wetness impregnation is preferred, though not required as the impregnation method. However, if the impregnation method does not involve the use of liquids, the drying of the resultant can be omitted as described below.

For example, when the impregnation of the active catalyst component is performed using wet impregnation, a precursor solution formed of the active catalyst component is added to and uniformly mixed with a mixture of thermally conductive material and the oxide carrier. When the active catalyst component is, for example, platinum, the precursor solution can be prepared by dissolving a platinum precursor, such as $Pt(NH_3)_4(NO_3)_2$, or the like, in water or in an alcohol-based solvent, such as methanol, ethanol, isopropyl alcohol, butyl alcohol, or the like. The mixing of the resultant (e.g., liquid mixture) is not specifically limited. For example, the resultant may be stirred at 40 to 80° C. for 1 to 12 hours.

Next, the resultant is dried, preferably at 100 to 160° C. for 3 to 5 hours.

Finally, the dried resultant is heat treated at 500 to 750° C. for 2 to 5 hours to prepare a pelletized hydrocarbon reforming catalyst. During heat treatment, when the temperature is lower than 500° C., the hydrocarbon reforming catalyst is not well crystallized. On the other hand, when the temperature is higher than 750° C., the particle size of the impregnated metal or catalyst is increased, and the reaction activity is decreased. Also, when the time of the heat treatment is shorter than 2 hours, the hydrocarbon reforming catalyst may not be sufficiently crystallized. On the other hand, when the time is longer than 5 hours, the process is uneconomical. The heat treating of the dried resultant may be performed in air, but is not specifically limited.

In various aspects, temperature lower than 500° C. or higher than 750° C., or time of heat treatment shorter than 2 hours or longer than 5 hours, or any of the above temperatures and times may be performed or applied to control the microstructure of the resultant and/or the hydrocarbon reforming catalyst. In various aspects, the temperature and times may be controlled or varied during heat treatment to control the microstructure of the resultant and/or the hydrocarbon reforming catalyst, or its components.

Referring to FIG. 5, according to another aspect of the present invention, method of preparing a hydrocarbon reforming catalyst includes impregnating an active catalyst component in an oxide carrier, drying the resultant, mixing the dried resultant with a thermally conductive material having higher thermal conductivity than that of the oxide carrier, and heat treating the resultant mixture.

Comparing the aspect of FIG. 5 and the aspect of FIG. 4, the difference is that in the aspect of FIG. 5, the active catalyst component is impregnated in the oxide carrier first and then the resultant is mixed with the thermally conductive material. Accordingly, the active catalyst component is impregnated in the oxide carrier using wet impregnation, or various impregnation methods listed above, or the like, the resultant is dried, and the resultant is then mixed with the thermally conductive material. After that, the method according to the aspect of FIG. 5 is the same as the method according to the aspect of FIG. 4.

According to an aspect of the present invention, a fuel processor including the hydrocarbon reforming catalyst described above is obtained or formed. The fuel processor according to this aspect can be obtained or formed by preparing a reformer including a supported (or impregnated) catalyst for a hydrocarbon reforming reaction, and including the reformer in the fuel processor. The supported catalyst for the hydrocarbon reforming reaction, for example, can be used by charging (or filling) a tubular reactor or a mixing a flow reactor with the supported catalyst in stationary phase, but is not limited thereto.

Prior to discussing the graphs of FIGS. 6-8, various example hydrocarbon reforming catalysts and various comparative example hydrocarbon reforming catalysts will be discussed as follows.

EXAMPLE 1

Aluminum (Al) powder (manufactured by Goodfellow, particle size 10 μm) as a thermally conductive material and $Al_2O_3$ carrier (manufactured by Aldrich, particle size 100 μm, surface area 150 $m^2g^{-1}$) as an oxide carrier were mixed at a weight ratio of 7:3 to prepare a mixture of 10 g.

0.408 g of $RuCl_3H_2O$ (manufactured by Aldrich) was dissolved in 5 ml of distilled water to prepare an aqueous ruthenium (Ru) solution.

The aqueous Ru solution was impregnated in the mixture using an incipient-wetness impregnation method, so that the amount of Ru in the formed catalyst was 2 wt %.

Next, the resultant product was dried at 120° C. for 4 hours, and then the dried resultant product was heat treated at 520° C. for 4 hours in air to prepare a pelletized hydrocarbon reforming catalyst.

EXAMPLE 2

0.286 g of $RuCl_3H_2O$ (manufactured by Aldrich) was dissolved in 3.5 ml of distilled water to prepare an aqueous Ru solution. The aqueous Ru solution was impregnated in 7 g of $Al_2O_3$ carrier (manufactured by Aldrich, particle size 100 μm, surface area 150 $m^2g^{-1}$) using an incipient-wetness impregnation method.

The resultant was dried at 120° C. for 4 hours.

Al powder (manufactured by Goodfellow, particle size 10 μm) as a thermally conductive material and the dried resultant were mixed at a weight ratio of 3:7 to obtain a mixture of 10 g. Also, the amount of Ru in the formed catalyst was regulated to 1.4 wt %.

The mixture was heat treated at 520° C. for 4 hours in air to prepare a pelletized hydrocarbon reforming catalyst.

EXAMPLE 3

0.204 g of $RuCl_3H_2O$ (manufactured by Aldrich) was dissolved in 2.5 ml of distilled water to prepare an aqueous Ru solution. The aqueous Ru solution was impregnated in 5 g of $Al_2O_3$ carrier (manufactured by Aldrich, particle size 100 μm, surface area 150 $m^2g^{-1}$) using an incipient-wetness impregnation method.

The resultant was dried at 120° C. for 4 hours.

Al powder (manufactured by Goodfellow, particle size 10 μm) as a thermally conductive material and the dried resultant were mixed at a weight ratio of 5:5 to obtain a mixture of 10 g. Also, the amount of Ru in the final catalyst was regulated to 1 wt %.

The mixture was heat treated at 520° C. for 4 hours in air to prepare a pelletized hydrocarbon reforming catalyst.

EXAMPLE 4

0.286 g of $RuCl_3H_2O$ (manufactured by Aldrich) was dissolved in 3.5 ml of distilled water to prepare an aqueous Ru solution. The aqueous Ru solution was impregnated in 7 g of $Al_2O_3$ carrier (manufactured by Aldrich, particle size 100 μm, surface area 150 $m^2g^{-1}$) using an incipient-wetness impregnation method.

The resultant was dried at 120° C. for 4 hours.

Graphite powder (manufactured by TIMCAL, product name TIMREX HASAG300 Graphite, particle size 1-32 μm) as a thermally conductive material and the dried resultant were mixed at a weight ratio of 3:7 to obtain a mixture of 10 g. Also, the amount of Ru in the final catalyst was regulated to 1.4 wt %.

The mixture was heat treated at 520° C. for 4 hours in air to prepare a pelletized hydrocarbon reforming catalyst.

COMPARATIVE EXAMPLE 1

A commercially available hydrocarbon reforming catalyst having a core and shell type structure (product name: RUA, manufacturer: Sud-Chemie, Japan, spherical shape having 3 mm diameter) was used. The amount of Ru as an active catalyst component was 2 wt %.

COMPARATIVE EXAMPLE 2

0.408 g of $RuCl_3H_2O$ (manufactured by Aldrich) was dissolved in 5 ml of distilled water to prepare an aqueous Ru solution. The aqueous Ru solution was impregnated in 10 g of $Al_2O_3$ carrier (manufactured by Aldrich, particle size 100 μm, surface area 150 $m^2g^{-1}$) using an incipient-wetness impregnation method, so that the amount of Ru in the final catalyst was 2 wt %.

The resultant was dried at 120° C. for 4 hours, and then the dried resultant was heat treated at 520° C. for 4 hours in air to prepare a pelletized hydrocarbon reforming catalyst.

COMPARATIVE EXAMPLE 3

0.204 g of $RuCl_3H_2O$ (manufactured by Aldrich) was dissolved in 2.5 ml of distilled water to prepare an aqueous Ru solution. The aqueous Ru solution was impregnated in 5 g of $Al_2O_3$ carrier (manufactured by Aldrich, particle size 100 μm, surface area 150 $m^2g^{-1}$) using an incipient-wetness impregnation method.

The resultant was dried at 120° C. for 4 hours.

$Al_2O_3$ carrier (manufactured by Aldrich, particle size 100 μm, surface area 150 $m^2g^{-1}$) and the dried resultant were mixed at a weight ratio of 5:5 to obtain a mixture of 10 g. Also, the amount of Ru in the final catalyst was regulated to 1 wt %.

The mixture was heat treated at 520° C. for 4 hours in air to prepare a pelletized hydrocarbon reforming catalyst.

Performance Test

Figure 6:
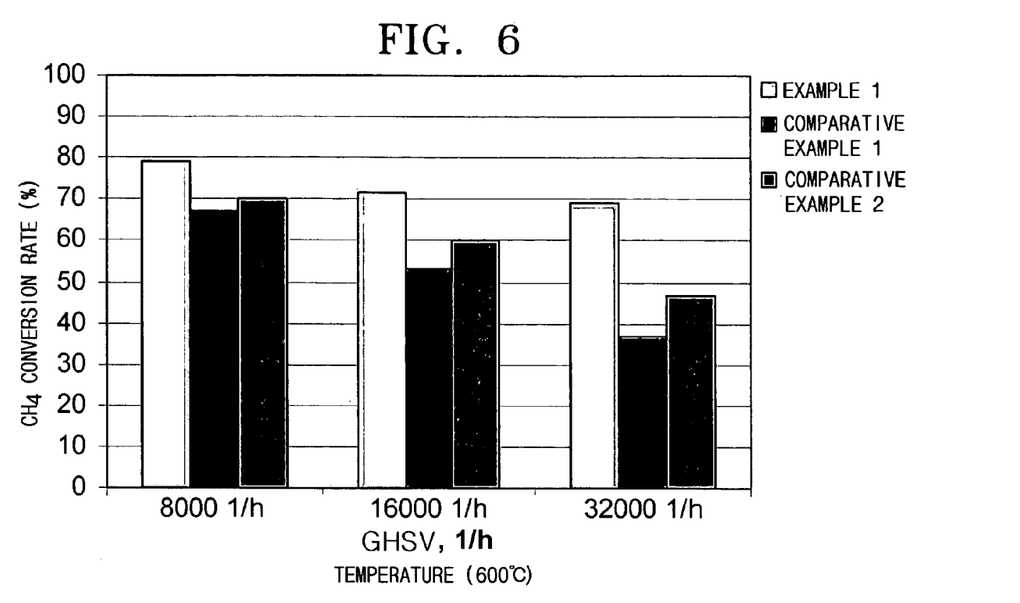
FIG. 6 is a graph illustrating methane gas conversion according to gas hourly space velocity (GHSV) at 600° C. of a hydrocarbon reforming catalyst of Example 1 and hydrocarbon reforming catalysts of Comparative Examples 1 and 2.

FIG. 6 is a graph illustrating a methane gas conversion according to a gas hourly space velocity (GHSV) at 600° C. The hydrocarbon reforming catalyst used were the hydrocarbon reforming catalyst of Example 1, the commercially available hydrocarbon reforming catalyst of Comparative Example 1, and the hydrocarbon reforming catalyst of Comparative Example 2 without a thermally conductive material. Referring to FIG. 6, the hydrocarbon reforming catalyst of Example 1 had an excellent (high) methane gas conversion rate at 600° C. compared to that of the commercially available hydrocarbon reforming catalyst of Comparative Example 1 and the hydrocarbon reforming catalyst of Comparative Example 2 without the thermally conductive material. Additionally, the hydrocarbon reforming catalyst of Comparative Example 2 with impregnated active catalyst component had a higher methane gas conversion rate than that of the Comparative Example 2 with the shell type structure.

Figure 7:
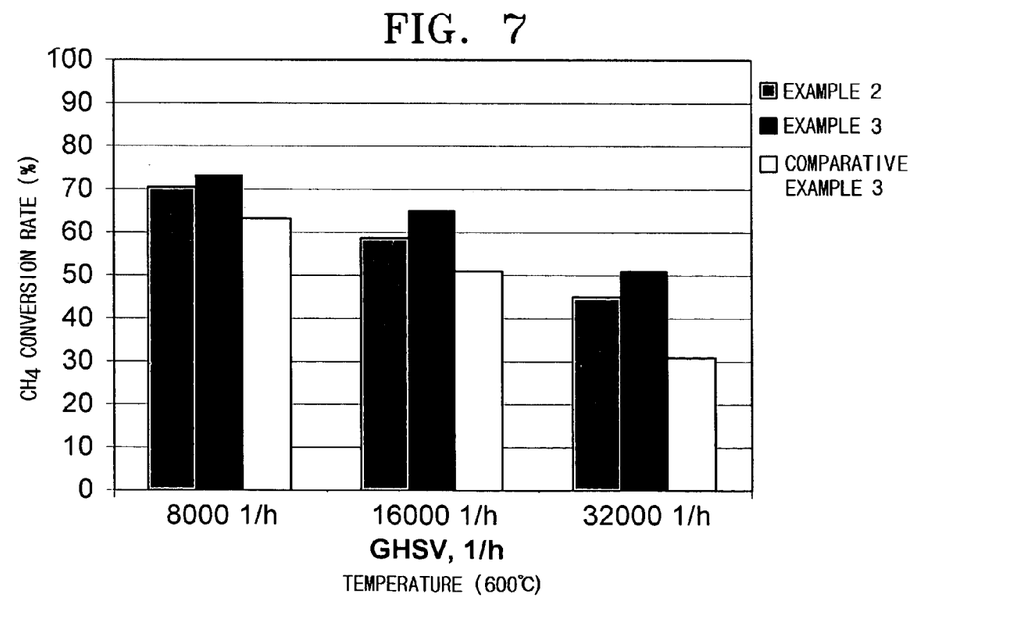
FIG. 7 is a graph illustrating methane gas conversion according to gas hourly space velocity (GHSV) at 600° C. of hydrocarbon reforming catalysts of Examples 2 and 3 and a hydrocarbon reforming catalyst of Comparative Example 3.

FIG. 7 is a graph illustrating a methane gas conversion according to a gas hourly space velocity (GHSV) at 600° C. The hydrocarbon reforming catalyst used were the hydrocarbon reforming catalysts of Examples 2 and 3 and the hydrocarbon reforming catalyst of Comparative Example 3 without a thermally conductive material. Referring to FIG. 7, the hydrocarbon reforming catalysts of Examples 2 and 3 had excellent (high) methane gas conversion rate under various weight ratios of the oxide carrier and the thermally conductive material compared to that of the hydrocarbon reforming catalyst of Comparative Example 3 without the thermally conductive material.

Figure 8:
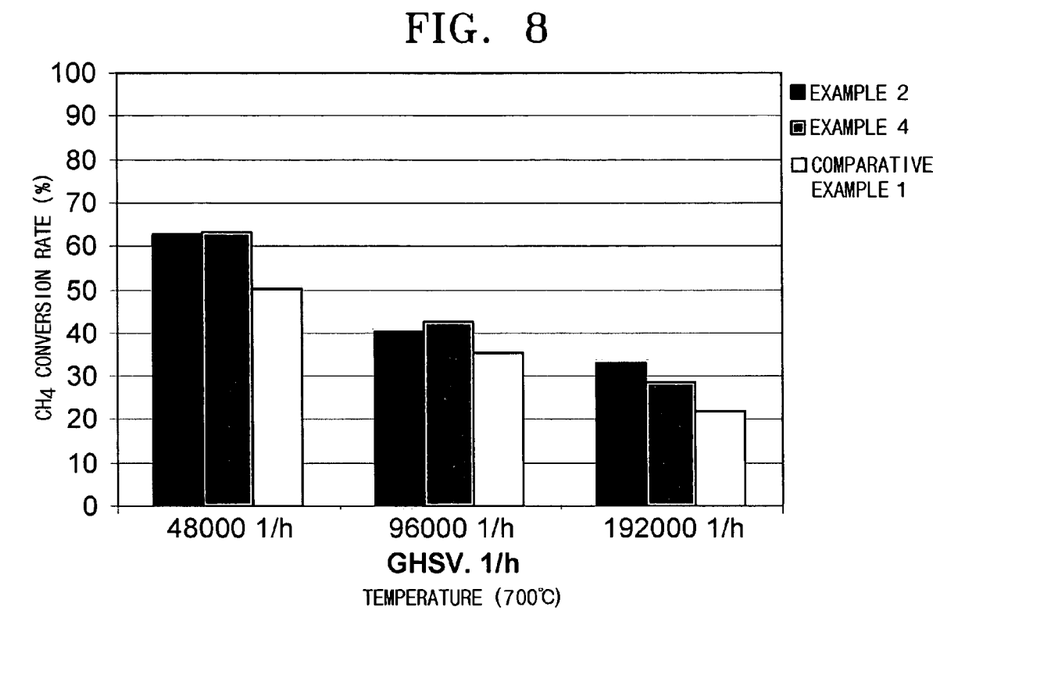
FIG. 8 is a graph illustrating methane gas conversion according to gas hourly space velocity (GHSV) at 700° C. of hydrocarbon reforming catalysts of Examples 2 and 4 and a hydrocarbon reforming catalyst of Comparative Example 1.

FIG. 8 is a graph illustrating a methane gas conversion according to a gas hourly space velocity (GHSV) at 700° C. of the hydrocarbon reforming catalysts of Examples 2 and 4 and the commercially available hydrocarbon reforming catalyst of Comparative Example 1. Referring to FIG. 8, various kinds of thermally conductive material can be used in the hydrocarbon reforming catalysts according to aspects of the present invention, as the hydrocarbon reforming catalyst of Comparative Example 1 with graphite powder has a comparable gas conversion rate as that of the hydrocarbon reforming catalyst of Example 2 with Al powder. Also, the hydrocarbon reforming catalysts of Examples 2 and 4 had excellent or high methane gas conversion rate compared to that of the commercially available hydrocarbon reforming catalyst of Comparative Example 1.

The hydrocarbon reforming catalyst according to aspects of the present invention has excellent or high catalytic activity and thermal conductivity, and can easily transfer heat required in a hydrocarbon reforming reaction. Accordingly, by using the hydrocarbon reforming catalyst of the various aspects of the present invention, a high hydrogen production rate can be obtained.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. A hydrocarbon reforming catalyst, comprising:
   an active catalyst component impregnated in an oxide carrier; and
   a thermally conductive material having higher thermal conductivity than that of the oxide carrier and mixed with the oxide carrier, wherein the oxide carrier and the thermally conductive material are in a powder form.

2. The hydrocarbon reforming catalyst of claim 1, wherein the surface area of the oxide carrier is in the range of 10 to 800 $m^2/g$.

3. The hydrocarbon reforming catalyst of claim 1, wherein the thermal conductivity of the thermally conductive material is in the range of 15 to 600 $Wm^{-1} K^{-1}$ at room temperature.

4. The hydrocarbon reforming catalyst of claim 1, wherein the oxide carrier comprises at least one of $Al_2O_3$, $SiO_2$, $TiO_2$, $ZrO_2$, and $CeO_2$.

5. The hydrocarbon reforming catalyst of claim 1, wherein the thermally conductive material comprises at least one of Al, C, Cu, Co, Fe, Ni, Zn, and Mn.

6. The hydrocarbon reforming catalyst of claim 1, wherein the amount of the oxide carrier is in the range of 10 to 90 wt % of the total weight of the oxide carrier and the thermally conductive material.

7. The hydrocarbon reforming catalyst of claim 1, wherein the amount of the thermally conductive material is in the range of 10 to 90 wt % of the total weight of the oxide carrier and the thermally conductive material.

8. The hydrocarbon reforming catalyst of claim 1, wherein the active catalyst component is formed of at least one of ruthenium (Ru), platinum (Pt), rhodium (Rh), cobalt (Co), nickel (Ni), and palladium (Pd).

9. The hydrocarbon reforming catalyst of claim 1, wherein the amount of the active catalyst component is in the range of 0.1 to 20 wt % of the amount of the hydrocarbon reforming catalyst.

10. A hydrocarbon reforming catalyst, comprising:
    an oxide;
    a catalyst component; and
    a thermally conductive material having a higher thermal conductivity than that of the oxide and mixed with the oxide, wherein the oxide and the thermally conductive material are in a powder form,
    wherein the catalyst component is impregnated into the oxide and/or the thermally conductive material.

11. The hydrocarbon reforming catalyst of claim 10, wherein the oxide comprises at least one of $Al_2O_3$, $SiO_2$, $TiO_2$, $ZrO_2$, and $CeO_2$.

12. The hydrocarbon reforming catalyst of claim 10, wherein the thermally conductive material comprises at least one of Al, C, Cu, Co, Fe, Ni, Zn, and Mn.

13. The hydrocarbon reforming catalyst of claim 10, wherein the active catalyst component is of at least one of Ru, Pt, Rh, Co, Ni, and Pd.

14. The hydrocarbon reforming catalyst of claim 10, wherein the catalyst component is impregnated by being interstitially dispersed.

15. A hydrocarbon reforming catalyst, comprising:
    an oxide;
    a catalyst component; and
    a thermally conductive material having a higher thermal conductivity than that of the oxide and mixed with the oxide, wherein the oxide and the thermally conductive material are in a powder form,
    wherein the catalyst component is not formed of a shell on the oxide.

16. The hydrocarbon reforming catalyst of claim 15, wherein the oxide comprises at least one of $Al_2O_3$, $SiO_2$, $TiO_2$, $ZrO_2$, and $CeO_2$.

17. The hydrocarbon reforming catalyst of claim 15, wherein the thermally conductive material comprises at least one of Al, C, Cu, Co, Fe, Ni, Zn, and Mn.

18. The hydrocarbon reforming catalyst of claim 15, wherein the active catalyst component is of at least one of Ru, Pt, Rh, Co, Ni, and Pd.

* * * * *